United States Patent [19]
Nagai et al.

[11] Patent Number: 5,457,817
[45] Date of Patent: Oct. 10, 1995

[54] TUNER OF A DOUBLE SUPERHETERODYNE RECEIVER

[75] Inventors: Hiroshi Nagai, Aichi; Akira Mishima, Gifu; Akio Iwase, Aichi, all of Japan

[73] Assignee: Matsushita Electric Industrial Co., Ltd., Osaka, Japan

[21] Appl. No.: 176,264

[22] Filed: Jan. 3, 1994

[30] Foreign Application Priority Data

Jan. 7, 1993 [JP] Japan .................................. 5-001033

[51] Int. Cl.⁶ .................................................. H04B 1/10
[52] U.S. Cl. ...................... 455/180.3; 455/189.1; 455/301; 455/310; 455/317; 361/814; 361/818
[58] Field of Search ........................... 455/180.3, 189.1, 455/260, 300, 301, 310–311, 312, 315, 317; 348/725, 731, 732, 737; 334/85; 331/68; 361/814, 816, 818

[56] References Cited

U.S. PATENT DOCUMENTS

| | | | |
|---|---|---|---|
| 4,352,209 | 9/1982 | Ma | 455/301 |
| 4,494,095 | 1/1985 | Noji et al. | 334/85 |
| 4,569,084 | 2/1986 | Takahama | 455/189.1 |
| 4,689,825 | 8/1987 | Geiger et al. | 455/301 |
| 4,691,378 | 9/1987 | Kumamoto et al. | 455/301 |
| 5,179,729 | 1/1993 | Mishima et al. | 455/260 |

FOREIGN PATENT DOCUMENTS

| | | | |
|---|---|---|---|
| 0204629 | 11/1983 | Japan | 455/301 |
| 0081925 | 5/1984 | Japan | 455/301 |
| 0212923 | 9/1986 | Japan | 455/315 |
| 2-217024 | 8/1990 | Japan . | |

Primary Examiner—Reinhard J. Eisenzopf
Assistant Examiner—Andrew Faile
Attorney, Agent, or Firm—Willian Brinks Hofer Gilson & Lione

[57] ABSTRACT

A first PLL 15 circuit connected to a first local oscillator 4 and a second PLL circuit 18 connected to a second local oscillator 10 are disposed in a same casing 20, and it is therefore not necessary to issue the output signal of the second local oscillator 10 or the divided output signal of the first local oscillator 4 outside of the casing 20, so that generation of undesired harmonic interference due to adverse effects of distribution thereof may be eliminated, thereby obtaining a favorable reception state.

2 Claims, 3 Drawing Sheets

TUNER OF A DOUBLE SUPERHETERODYNE RECEIVER

BACKGROUND OF THE INVENTION

1) Field of the Invention

The present invention relates to a double super heterodyne tuner to be used in the television receiver and the like.

2) Description of the Prior Art

A conventional double super heterodyne tuner is described below.

FIG. 3 is a block diagram showing the constitution of a conventional double super heterodyne tuner. In FIG. 3, an RF signal entered from an antenna is fed into an RF amplifier 2 through an input terminal 1 to be selected and amplified, and is mixed with a signal issued from a first local oscillator 4 in a first mixer 3, and is converted into a first intermediate frequency signal. Since the first intermediate frequency signal is generally set at a frequency higher than the RF signal in a receiving band, the portion up to conversion into the first intermediate frequency signal is called an upconverter 21. The first intermediate frequency is selected and amplified in a first intermediate frequency amplifier 8, and given to a second mixer 9, where it is mixed with a signal from a second local oscillator 10 to be converted into a second intermediate frequency signal. The signal from the second mixer 9 is given to a second intermediate frequency amplifier 13, and is amplified and issued to an output terminal 14. The second intermediate frequency signal given to the output terminal 14 is generally set at a frequency lower than the RF signal in a receiving band, and hence the portion of converting the first intermediate frequency signal into the second intermediate frequency signal is called a downconverter 22.

The first local oscillator 4 is composed of a voltage controlled oscillator, and the output of the first local oscillator 4 is divided in a predivider 5 at a specific frequency dividing ratio (for example, 1/256), and the divided frequency signal is output through a first local oscillation dividing output terminal 6. The output signal is connected to a PLL frequency synthesizer at the set side composed of a variable divider, a reference oscillator, a phase comparator, and a low pass filter, a controlled voltage fixed at an arbitrary local oscillation frequency by the station selection data given to the variable divider is generated, and this voltage is supplied into a first local oscillation controlled voltage input terminal 7, and is controlled to a desired local oscillation frequency.

The second local oscillator 10 is also composed of a voltage controlled oscillator, and as the output of the second local oscillator 10, the oscillation frequency signal itself is issued from a second local oscillation output terminal 11. This output is similarly connected to a PLL frequency synthesizer, and the local oscillation frequency is controlled.

Prior art of this type is disclosed, for example, in the Japanese Laid-open Patent Publication Hei. 2-217024.

SUMMARY OF THE INVENTION

In such a conventional double superheterodynl tuner, however, the signal issued from the second local oscillation output terminal 11 adversely affected the other RF devices, or harmonics of signals issued from the first local oscillation output terminal 8 influenced the signal of the output terminal 14 issuing the second intermediate frequency signal, thereby impairing the reception state.

For example, the first picture intermediate frequency to be 965.25 MHz and the second picture carrier frequency to be 58.75 MHz, when receiving channel 52 of television broadcasting in Japan (picture carrier frequency 705.25 MHz), the oscillation frequency of the second local oscillator 10 is 906.5 MHz. The oscillation frequency of the first local oscillator 4 is 1670.5 MHz, and assuming the dividing ratio of the predivider 5 at this time to be 1/256, the ninth harmonic of the output signal of the predivider 5 is generated around 58.73 MHz, and since this ninth harmonic is close to the second picture intermediate frequency of 58.75 MHz, it adversely affects the second picture intermediate frequency to impair the reception state.

The invention is intended to solve such problems, and it is hence a primary object thereof to present a double super heterodynl tuner capable of obtaining a favorable reception state by eliminating generation of undesired harmonic.

To achieve the object, in the double super heterodynl tuner of the invention, a first PLL circuit is connected to a first local oscillator, and a second PLL circuit is connected to a second local oscillator, and they are combined into one body and incorporated in the casing of the double super heterodynl tuner.

In this constitution, since it is not necessary to issue the output signal of the second local oscillator or the divided output signal of the first local oscillator to outside of the casing, there is no adverse effect on other circuits due to distribution thereof, so that a favorable reception state may be achieved.

DESCRIPTION OF THE PREFERRED EMBODIMENTS

Figure 1:
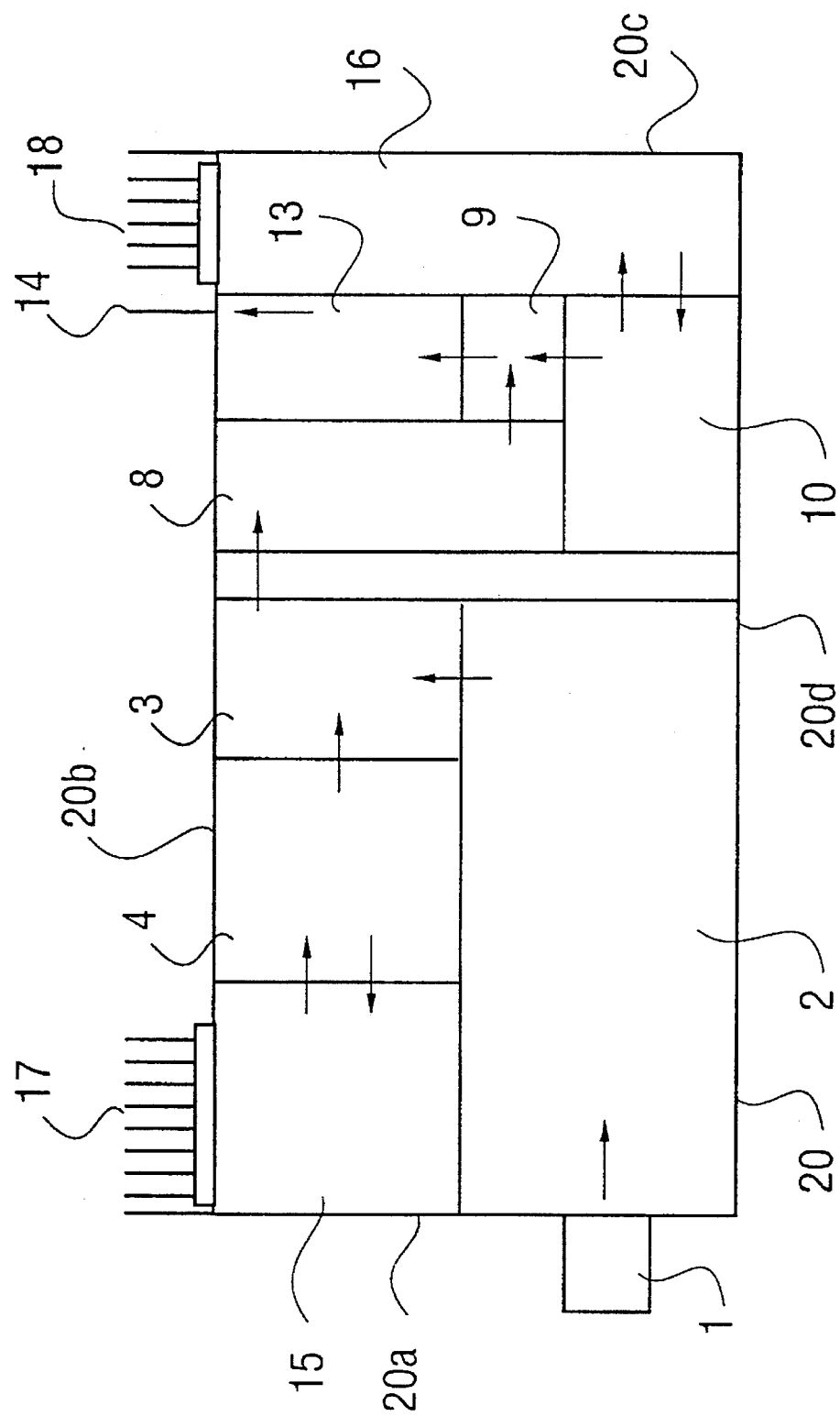
FIG. 1 is a configuration diagram of a double super heterodynl tuner of the invention.
Figure 2:
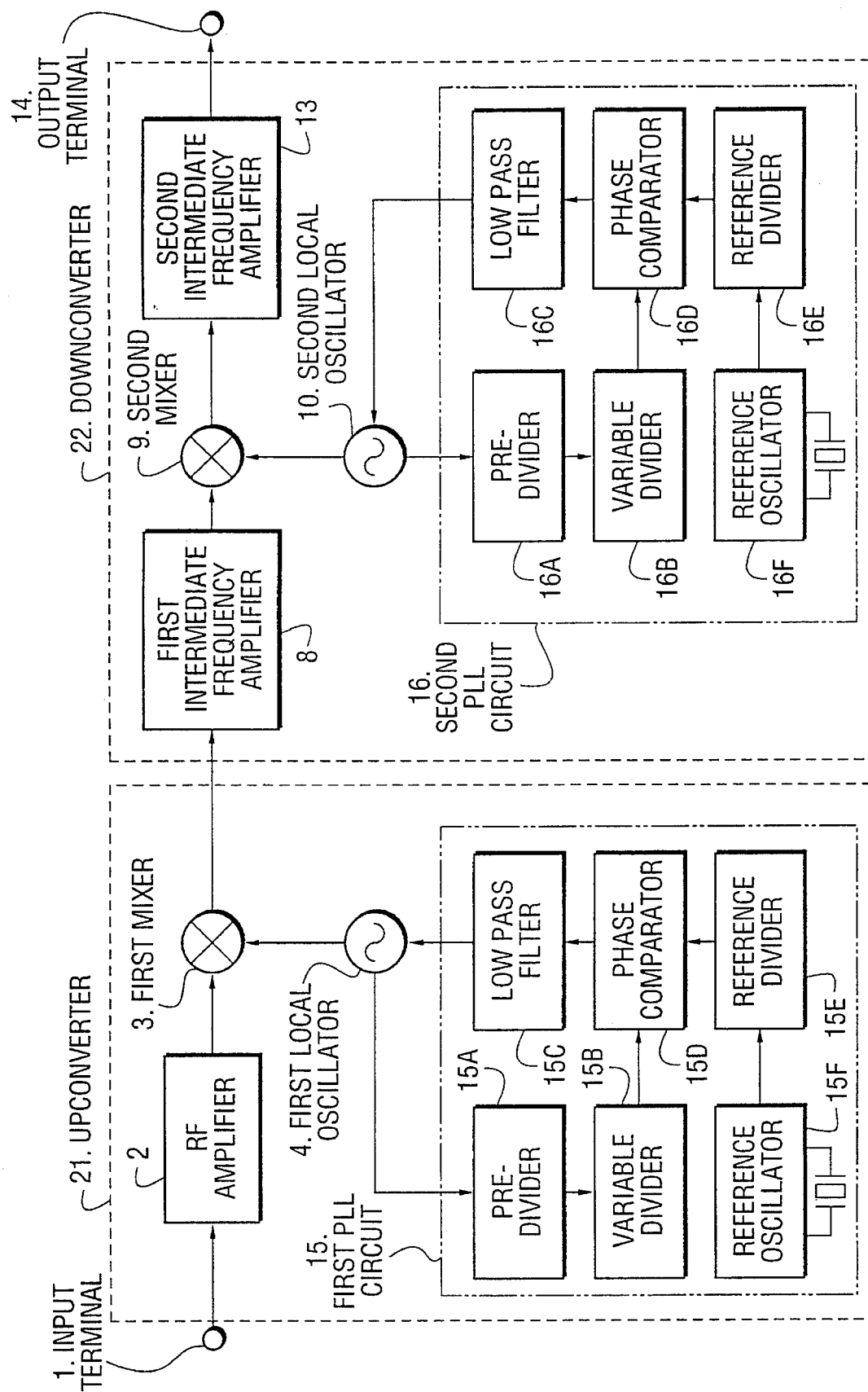
FIG. 2 is a circuit block diagram of the double super heterodynl tuner of the invention.
Figure 3:
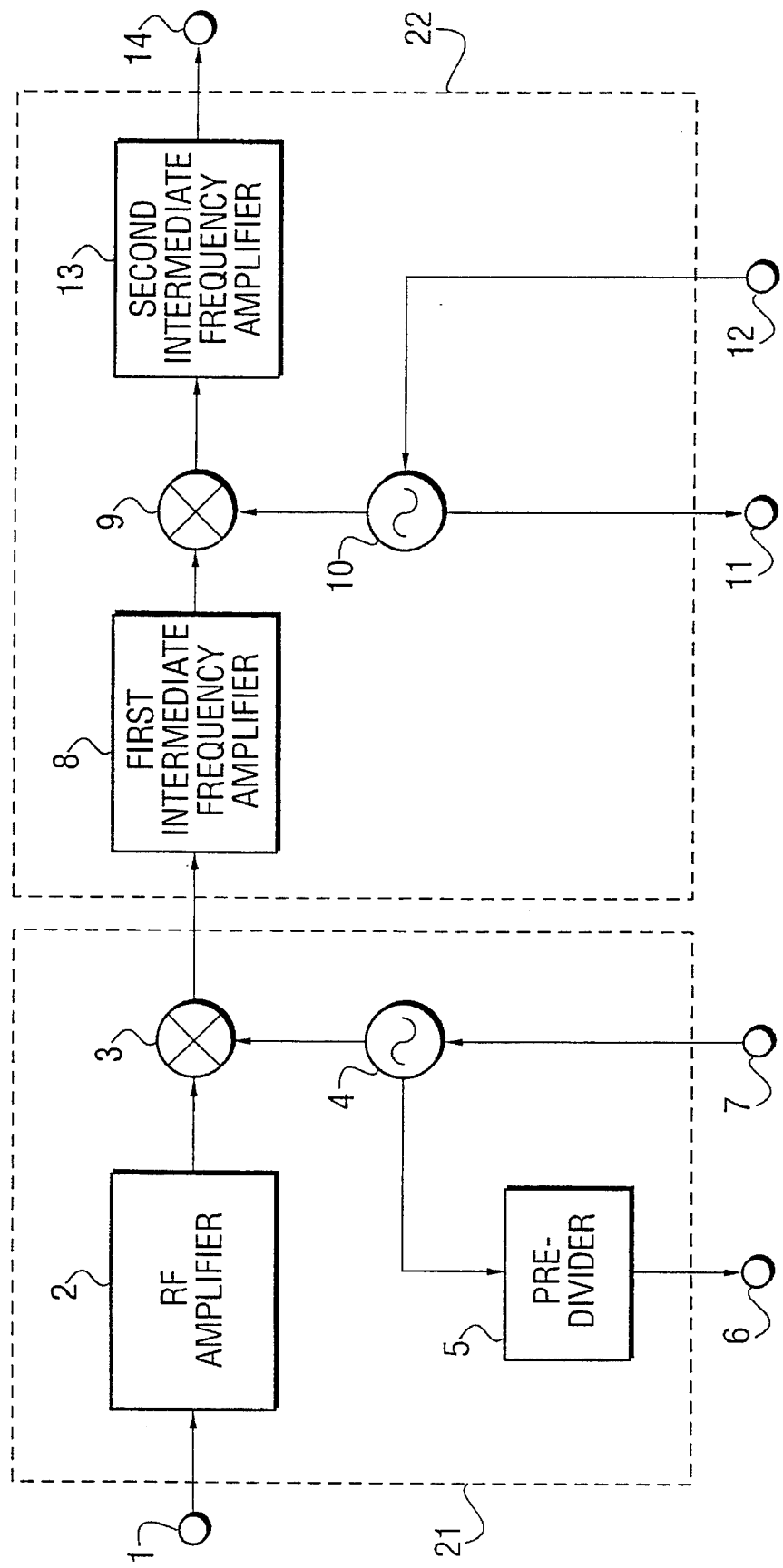
FIG. 3 is a circuit block diagram of a conventional double super heterodyne tuner.

Referring now to the drawings, an embodiment of the invention is described in detail below. FIG. 1 is a configuration of a double super heterodyne tuner in an embodiment of the invention, and FIG. 2 is its block diagram. Same identical parts shown in FIGS. 1, 2, and 3 are identified with the same reference numerals.

In FIGS. 1 and 2, numeral 1 is an input terminal, and this input terminal 1 is provided inside of one vertical side surface 20a of a metallic casing 20. Numeral 2 is an RF amplifier 2, and the input of this RF amplifier 2 is connected to the input terminal 1, and the output is connected to one input of a first mixer 3. Numeral 4 is a first local oscillator, and its output is connected to the other input of the first mixer 3. The first local oscillator 4 is connected to a first PLL circuit 15.

Numeral 8 denotes a first intermediate frequency amplifier, and the input of the first intermediate frequency amplifier is connected to the output of the first mixer 8, and its output is connected to one input of a second mixer 9. Numeral 10 denotes a second local oscillator, and its output is connected to the other input of the second mixer 9. The second local oscillator is connected to a second PLL circuit 16.

Numeral 13 denotes a second intermediate frequency amplifier, and the input of the second intermediate frequency amplifier 13 is connected to the output of the second mixer 9, and its output is connected to an output terminal 14 provided in a lateral side surface 20*b* of the casing 20.

Each circuit block is shielded by a metal partition board, and is disposed inside the casing. In the configuration of FIG. 1, the first PLL circuit 15 is placed in contact with one vertical side surface 20*a* and lateral side surface 20*b* in the casing 20, and the first local oscillator 4 is disposed at the lateral side surface 20*b* side, close to the first PLL circuit 15. In contact with the other vertical side surface 20*c* of the casing 20 is, the second PLL circuit 16, and the second local oscillator 10 is disposed in contact with the other lateral side surface 20*d*, close to the second PLL circuit 16.

Numeral 17 is an input terminal for power source and station selection data of an upconverter 21 of the double super heterodyne tuner, being the input terminal for the power source and station selection data to the first PLL circuit 15, and the power source to be supplied to the RF amplifier 2, first mixer 3 and first local oscillator 4, and others. This input terminal 17 is disposed at the lateral side surface 20*b* side, close to the first PLL circuit 15.

Numeral 18 is an input terminal for power source, and station selection data of a downconverter 22 of the double super heterodyne tuner, being the input terminal for the power source and station selection data to the second PLL circuit 16, and the power source to be supplied to the first intermediate frequency amplifier 8, second mixer 9, second local oscillator 10, and second intermediate amplifier 13. This input terminal 18 is disposed at the lateral side surface 20*b* side, close to the second PLL circuit 16.

In this way, the first PLL circuit 15 and second PLL circuit 16 are combined into one body and incorporated in the double super heterodyne tuner casing 20.

In thus composed double super heterodyne tuner, its operation is described below with reference to FIG. 2. The RF signal from the antenna is fed from the input terminal 1 into the RF amplifier 2 to be selected and amplified, and then fed into the first mixer 3 to be mixed with the signal from the first local oscillator 4, and is converted into a first intermediate frequency signal. This first intermediate frequency signal is selected and amplified in the first intermediate frequency amplifier 8, and is given to the second mixer 9 to be mixed with the output signal from the second local oscillator 10, and is converted into a second intermediate frequency signal. The signal converted by the second mixer 9 is given to the second intermediate frequency amplifier 13 to be amplified, and is issued to the output terminal 14.

The first local oscillator 4 is composed of a voltage controlled oscillator, and the output of the first local oscillator 4 is divided at a specific frequency dividing ratio in a predivider 15A composing the first PLL circuit 15, and is further divided in a variable divider 15B at a frequency dividing ratio corresponding to the station selection data entered from the input terminal 17. The output of the variable divider 15B is given to a phase comparator 15D, and is compared in phase with the reference frequency signal issued from a reference oscillator 15F composed of a quartz oscillator and a reference divider 15E for dividing its signal. The output of the phase comparator 15D is fed into a low pass filter 15C to be converted into a control voltage for controlling the oscillation frequency of the first local oscillator 4. These are put together to compose a PLL frequency synthesizer, and by varying the station selection data, the local oscillation frequency of the first local oscillator 4 is controlled. The first local oscillator 4 generates an oscillation frequency necessary for converting a harmonic signal of desired frequency into a specified intermediate frequency signal.

The second local oscillator 10 is also composed of a voltage controlled oscillator, and a PLL frequency synthesizer is similarly constituted. That is, the second local oscillator 10, by varying the station selection data entered from the input terminal 18, controls the local oscillation frequency of the second local oscillator 10, and obtains an oscillation frequency necessary for converting the first intermediate frequency signal into a specified second intermediate frequency signal.

According to the embodiment, the first PLL circuit 15 is connected to the first local oscillator 4, the second PLL circuit 16 is connected to the second local oscillator 10, and they are combined into one body and incorporated in the casing 20 of the double super heterodyne tuner, and therefore the PLL circuits and local oscillators are connected inside the casing 20, so that the wiring distance may be shortest. Hence, without generation of undesired RF signal, a favorable reception state is obtained.

Moreover, the first PLL circuit 15 is provided at one vertical side surface 20*a* of the casing 20, and the first local oscillator 4 is disposed close to this first PLL circuit 15, while the second PLL circuit 16 is provided at the other vertical side surface 20*c* of the casing 20, and the second local oscillator 10 is disposed close to this second PLL circuit 16, and therefore it is not necessary to issue the output signal of the second local oscillator 10 and the divided output signal of the first local oscillator 4 to outside of the casing 20. Accordingly, generation of undesired harmonic signal due to distribution or the like does not occur, so that a favorable reception state is obtained.

Incidentally, in FIG. 1, connectors may be used as the input terminal 17 for power source and station selection data of the upconverter 21 of the double super heterodyne tuner, and the input terminal 18 for power source, and station selection data of the downconverter 22 of the double super heterodyne tuner. In such a case, the connector corresponding to the input terminal 17 is disposed in a circuit block shielded by a metallic partition board of the first PLL circuit 15, and the connector corresponding to the input terminal 18 is disposed in a circuit block shielded by a metallic partition board of the second PLL circuit 16. Hence, undesired radiation of the signals from the first local oscillator 4 and second local oscillator 10 from the data input terminals of power source and station selection data by inducing in the power source wiring line may be reduced. Incidentally, as the output terminal 14, a part of the connector corresponding to the input terminal 18 may be used.

Thus, according to the double super heterodyne tuner of the invention, since the first PLL circuit connected to the first local oscillator and the second PLL circuit connected to the second local oscillator are incorporated inside the casing of the double super heterodyne tuner, it is not necessary to issue the output signal of the second local oscillator and the divided output signal of the first local oscillator to the outside of the casing. Hence, eliminating generation of undersired harmonic signals due to adverse effects of distribution, an excellent double super heterodyne tuner capable of obtaining a favorable reception state may be realized.

Besides, by integrating and mounting in one body, smaller size and lower cost may be realized.

What is claimed is:

1. A double superheterodyne tuner comprising a metallic rectangular casing, an input terminal located at one side of the casing, an RF amplifier connected to the input terminal, a first mixer having one input connected to the output of the RF amplifier and other input connected to the output of a first local oscillator, a first intermediate frequency amplifier connected to the output of the first mixer, a second mixer having one input connected to the output of the first intermediate frequency amplifier and other input connected to the output of a second local oscillator, a second intermediate frequency amplifier connected to the output of the second mixer, and an output terminal located at another side of the casing and connected to the output of the second intermediate frequency amplifier, wherein a first phase locked loop (PLL) circuit is connected to the first local oscillator, a second PLL circuit is connected to the second local oscillator, and the first PLL circuit is located on a side surface in the casing which has said input terminal thereon, the first oscillator is located close to the first PLL circuit, the second PLL circuit is located on a side surface in the casing opposite to the side which has said input terminal thereon, and the second local oscillator is located close to the second PLL circuit.

2. A double superheterodyne tuner comprising a metallic rectangular casing, an input terminal located on one side of the casing, an RF amplifier connected to the input terminal, a first mixer having one input connected to the output of the RF amplifier and other input connected to the output of a first local oscillator, a first intermediate frequency amplifier connected to the output of the first mixer, a second mixer having one input connected to the output of the first intermediate frequency amplifier and other input connected to the output of a second local oscillator, a second intermediate frequency amplifier connected to the output of the second mixer, and an output terminal located on another side of the casing and connected to the output of the second intermediate frequency amplifier, wherein a first phase locked loop (PLL) circuit is connected to the first local oscillator, a second PLL circuit is connected to the second local oscillator, and the first PLL circuit is located on the side surface in the casing having the input terminal thereon, the first oscillator is disposed close to the first PLL circuit, the second PLL circuit is located on a side surface in the casing opposite to the side having the input terminal thereon, the second local oscillator is located close to the second PLL circuit, a first connector is located in a side surface adjacent to the side surface having the first PLL circuit, and a second connector is located in a side surface adjacent to the side surface having the second PLL circuit.

* * * * *

UNITED STATES PATENT AND TRADEMARK OFFICE
CERTIFICATE OF CORRECTION

PATENT NO.    :  5,457,817
DATED         :  October 10, 1995
INVENTOR(S)   :  Hiroshi Nagai et al.

It is certified that error appears in the above-indentified patent and that said Letters Patent is hereby corrected as shown below:

Title Page, Abstract, Line 2:  "18" should read --16--.

Column 1, Line 44:  "filter, a" should read --filter.  A--.

Column 1, Line 61:  "superheterodynl" should read --superheterodyne--.

Column 1, Line 65:  "8" should read --6--.

Column 2, Line 1:  "example," should read --example, assuming--.

Column 2, Lines 15 and 16:  "super heterodynl" should read --superheterodyne--.

Column 2, Line 18:  "super heterodynl" should read --superheterodyne--.

Column 2, Lines 22 and 23:  "super heterodynl" should read --superheterodyne--.

Column 2, Lines 33 and 34:  "super heterodynl" should read --superheterodyne--.

Column 2, Lines 35 and 36:  "super heterodynl" should read --superheterodyne--.

Column 2, Line 38:  "super heterodyne" should read --superheterodyne--.

UNITED STATES PATENT AND TRADEMARK OFFICE
CERTIFICATE OF CORRECTION

PATENT NO. : 5,457,817
DATED : October 10, 1995
INVENTOR(S) : Hiroshi Nagai et al.

It is certified that error appears in the above-indentified patent and that said Letters Patent is hereby corrected as shown below:

Column 2, Line 45: "super heterodyne" should read --superheterodyne--.

Column 2, Lines 46 and 47: "Same identical" should read --Identical--.

Column 3, Line 17: "super heterodyne" should read --superheterodyne--.

Column 3, Line 24: "super heterodyne" should read --superheterodyne--.

Column 3, Line 33: "super heterodyne" should read --superheterodyne--.

Column 3, Line 34: "super heterodyne" should read --superheterodyne--.

Column 4, Line 14: "super heterodyne" should read --superheterodyne--.

Column 4, Line 31: "super heterodyne" should read --superheterodyne--.

Column 4, Lines 33 and 34: "super heterodyne" should read --superheterodyne--.

Column 4, Line 46: "super heterodyne" should read --superheterodyne--.

Column 4, Line 50: "super heterodyne" should read --superheterodyne--.

Column 4, Line 54: "undersired" should read --undesired--.

UNITED STATES PATENT AND TRADEMARK OFFICE
CERTIFICATE OF CORRECTION

PATENT NO. : 5,457,817

DATED : October 10, 1995

INVENTOR(S) : Hiroshi Nagai et al.

It is certified that error appears in the above-identified patent and that said Letters Patent is hereby corrected as shown below:

Column 4, Line 55: "super heterodyne" should read --superheterodyne--.

Signed and Sealed this

Second Day of September, 1997

*Attest:*

BRUCE LEHMAN

*Attesting Officer*  Commissioner of Patents and Trademarks